(12) United States Patent
Biles et al.

(10) Patent No.: US 7,694,794 B2
(45) Date of Patent: Apr. 13, 2010

(54) PTO CLUTCH WITH LUBRICATION OIL SHUT-OFF VALVE AND INTEGRATED RELIEF VALVE

(75) Inventors: Brian E. Biles, Cedar Falls, IA (US); Craig A. Puetz, Waterloo, IA (US); Chad E. Schoneman, Waterloo, IA (US)

(73) Assignee: Deere & Company, Moline, IL (US)

( * ) Notice: Subject to any disclaimer, the term of this patent is extended or adjusted under 35 U.S.C. 154(b) by 505 days.

(21) Appl. No.: 11/754,736

(22) Filed: May 29, 2007

(65) Prior Publication Data

US 2008/0296115 A1    Dec. 4, 2008

(51) Int. Cl.
*F16D 13/72* (2006.01)

(52) U.S. Cl. .............................. 192/70.12; 192/113.35

(58) Field of Classification Search ............. 192/113.35
See application file for complete search history.

(56) References Cited

U.S. PATENT DOCUMENTS

| 3,760,918 A | 9/1973 | Wetrich et al. |
| 4,540,078 A | 9/1985 | Wetrich |
| 5,577,588 A * | 11/1996 | Raszkowski ........... 192/113.35 |

FOREIGN PATENT DOCUMENTS

| GB | 2001713 A | * | 2/1979 |
| JP | 4-19426 A | * | 1/1992 |

\* cited by examiner

*Primary Examiner*—Richard M. Lorence

(57) ABSTRACT

A PTO clutch includes a lubrication shut-off valve that can slide between a first position blocking a port for lubrication oil to lubricate the PTO clutch, and a second position opening the port to lubricate the clutch. A relief valve is provided in the lubrication shut off valve, which opens in response to pressure spikes of activation oil and isolates the pressure spikes from the clutch piston.

15 Claims, 4 Drawing Sheets

US 7,694,794 B2

PTO CLUTCH WITH LUBRICATION OIL SHUT-OFF VALVE AND INTEGRATED RELIEF VALVE

FIELD OF THE INVENTION

This invention relates generally to activation and lubrication of power-take-off (PTO) clutches on tractors and other utility vehicles used for off-road or agricultural work.

BACKGROUND OF THE INVENTION

In clutches for PTOs on tractors and other utility vehicles, clutch plates or disks are frictionally engaged. This friction generates heat and excessive heat can cause premature clutch wear and failure. For this reason, many tractors use hydraulically engaged wet clutches wherein cooled and filtered hydraulic oil flows through the clutch assembly. The cooling oil flows through the clutch continuously while the clutch is engaged. However, energy is wasted if cooling oil flows through the PTO clutch assembly while the clutch is disengaged.

U.S. Pat. No. 4,540,078 entitled Clutch Lube Control relates to a hydraulic control circuit that temporarily increases flow of cooling and lubrication oil when the PTO clutch changes from a disengaged to an engaged state. A lube valve moves to an increased flow position for a certain time period after engagement of the PTO clutch.

PTO clutches for tractors and other utility vehicles may be activated by hydraulic oil pressure moving a clutch piston to shift plates and disks into fractional engagement. A pressure regulating valve may be provided between the main hydraulic circuit and the clutch piston. Pressure spikes may occur in the main hydraulic circuit (i.e., from turning the steering wheel to the stops), and the pressure regulating valve prevents them from reaching the clutch piston. Dedicated circuits with specific pressure settings are used to prevent pressure spikes from reaching the clutch piston.

A PTO clutch is needed that does not require a dedicated circuit to shut off lubrication oil to the PTO clutch when the clutch is disengaged. A PTO clutch is needed that does not require a dedicated circuit to limit pressure spikes in the clutch activation pressure from reaching the clutch piston. A PTO clutch is needed that provides these advantages with a simplified hydraulic circuit for supplying oil to the clutch.

SUMMARY OF THE INVENTION

A PTO clutch is provided having a lubrication oil shut off valve and an integrated relief valve. Lubrication oil and activation oil both travel through a common bore in the clutch shaft. Lubrication oil may be supplied from one end, and clutch activation oil supplied from the other. The PTO clutch has a lubrication shut off valve with a spool positioned in the common oil supply passage. Lubrication oil flows through the spool, and then out a radial port in the spool to lubricate the clutch. Activation oil is separated from lubrication oil by a ball and spring relief valve located inside the valve spool. The lubrication oil shut off valve may shift between too positions in response to force supplied from the lubrication oil pressure on a first end of the spool and clutch activation oil pressure on the second end.

When the PTO clutch is disengaged, activation oil pressure is effectively zero. Lubrication oil pressure shifts the lubrication shut off valve spool info a position that closes the port for lubrication oil. When the PTO clutch is engaged, activation oil pressure is much higher than lubrication oil pressure. The high pressure activation oil shifts the lubrication shut off valve spool into a second position which opens the port for lubrication oil. If the activation circuit experiences a pressure spike higher than the set point of the relief valve, the ball is unseated, the spring compresses, and oil is allowed to flow from the high pressure activation oil circuit to the low pressure lubrication oil circuit. The relief valve isolates the clutch piston from pressure spikes above the set point of the relief valve.

The present invention provides a simplified circuit for supplying oil to the PTO clutch, and eliminates a need for a dedicated circuit with a specific pressure setting. The integrated relief valve protects the clutch piston from pressure spikes, and clutch activation pressure can be supplied in parallel with a higher pressure circuit.

DESCRIPTION OF THE PREFERRED EMBODIMENT

Figure 1:
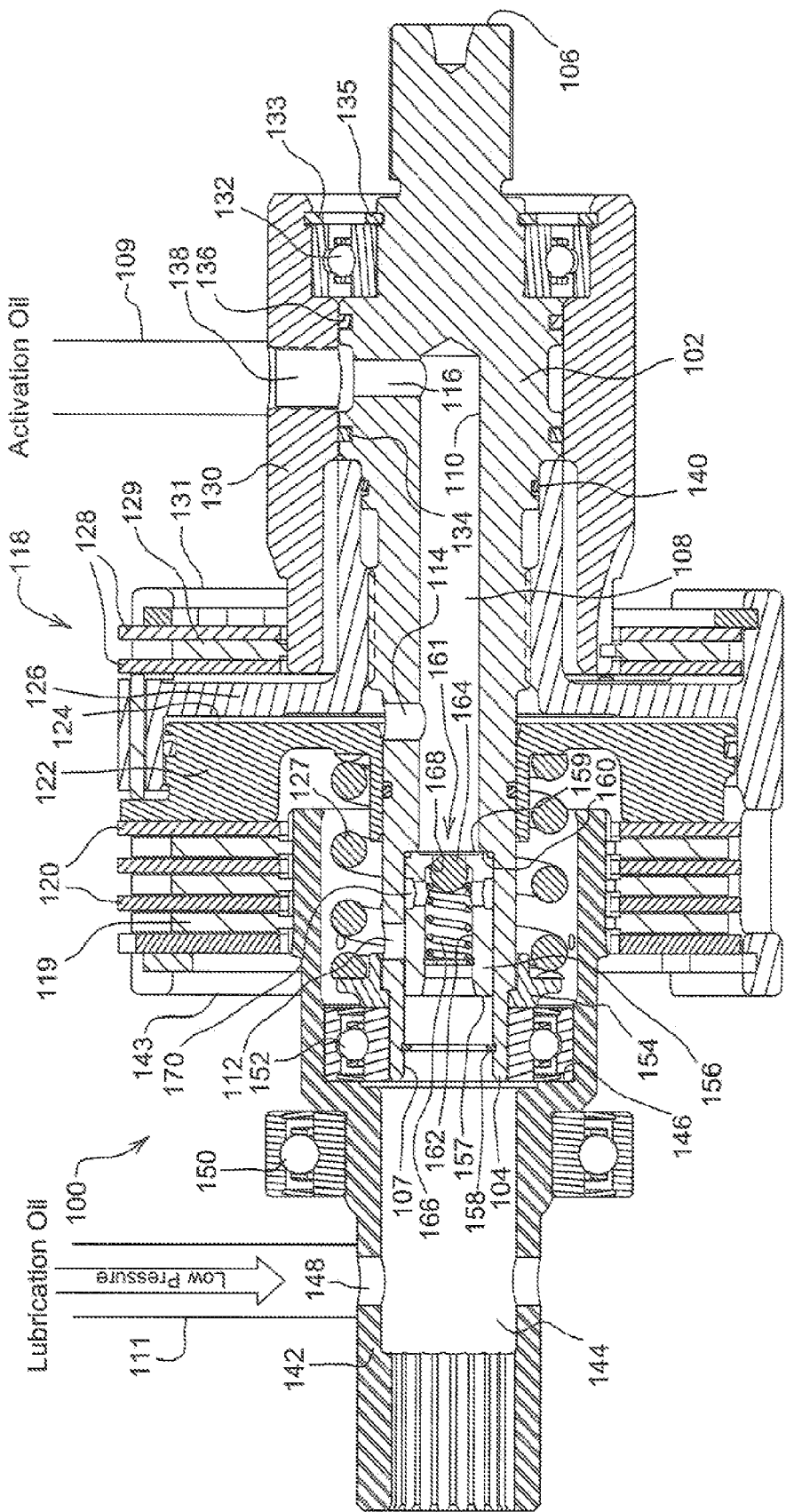
FIG. 1 is a cross section view of a PTO clutch having a lubrication oil shut-off valve and an integrated relief valve according to a first embodiment, with the PTO clutch disengaged, lubrication flow off, and the relief valve closed.

In a first embodiment, a PTO clutch is provided that includes a lubrication shut off valve that shuts off the supply of lubrication oil to the clutch plates when they are disengaged. The lubrication shut off valve slides in response to the difference in pressure between the lubrication oil and the activation oil. Additionally, the PTO clutch includes an integrated relief valve that prevents pressure spikes in the PTO clutch activation oil circuit from reaching the clutch piston. The PTO clutch may be connected to conduits for lubrication oil and PTO clutch activation oil.

In a first embodiment shown in FIGS. 1-4, PTO clutch 100 includes clutch shaft 102 which may be a cylindrical body having a first end 104 and a second end 108. The second end of clutch shaft 102 may be externally splined for attachment to an implement. Longitudinal bore 108 extends between the first end 104 of the clutch shaft and a second end 110 within the clutch shaft. Lubrication oil and clutch activation oil both travel through this longitudinal bore. Lubrication oil is supplied from the first end 104 and clutch activation oil is supplied from the second end 110.

In one embodiment, radial ports 112, 114, 116 extend radially between the longitudinal bore and the outer surface of the clutch shaft. First radial port 112 may be a lubrication oil outlet from the longitudinal bore to clutch plates 120, and may be located adjacent first end 107 of the longitudinal bore, which is the lubrication oil inlet end. Second radial port 114 may be a clutch activation oil outlet from the longitudinal bore to a gap 124 next to annular piston 122, and may be near the midpoint of the longitudinal bore. Third radial port 118 may a clutch activation oil inlet into the second end 110 of the longitudinal bore, which is the activation oil inlet end. The clutch shaft may be attached to a conduit 109 which carries clutch activation oil into the activation oil inlet end 110 of longitudinal bore 108 through radial port 116, to engage the PTO clutch.

In one embodiment, clutch shaft 102 extends through a central opening in annular PTO clutch assembly 118. The PTO clutch assembly may include a plurality of friction disks 119 and separator plates 120 that are urged into frictional contact by annular piston 122 as the PTO clutch is engaged. Annular piston 122 can move longitudinally in response to hydraulic oil pressure in gap 124 between cylinder 126 and the annular piston. Compression spring 127 urges annular piston 122 toward the PTO clutch disengaged position. The PTO clutch assembly also may include friction disks 128 and separator plates 129 for braking the PTO.

In one embodiment, the second end of clutch shaft 102 may be inserted through sleeve 130 which fits into the central opening at the first end 131 of PTO clutch assembly 118. The outer diameter of sleeve 130 may include splined connections for brake disks 128. Annular bearing 132 may be positioned between the outer diameter of clutch shaft 102 and sleeve 130, and may be held in place by a pair of snap rings 133, 135. Seal rings 134, 136 may be positioned in grooves in the outer diameter of clutch shaft 102, to seal each side of radial port 138 in sleeve 130. Radial port 138 in sleeve 130 may be positioned for fluid communication with third radial port 118 in clutch shaft 102. O-ring seal 140 may be provided between the outer diameter of clutch shaft 102 and PTO clutch assembly 118.

In one embodiment, hub 142 may be internally splined to a rotating output shaft of an internal combustion engine or other motor drive train. Hub 142 may fit into the central opening at the second end 143 of PTO clutch assembly 118, around the first end 104 of clutch shaft 102. Longitudinal bore 144 may extend through the hub, and may have an internal shoulder 146. Radial port 148 may extend from longitudinal bore 144 to the outer diameter of hub 142. Hub 142 may be attached to a conduit 111 that carries lubrication oil through radial port 148 which is the lubrication oil inlet into longitudinal bore 144 and into the lubrication oil inlet end 107 of clutch shaft 102. Annular bearing with seal 150 may be provided around the outer diameter of hub 142.

In one embodiment, sealed bearing 152 may be positioned on internal shoulder 146 of longitudinal bore 144. The first end 104 of clutch shaft 108 may extend through bearing 152. Thrust washer 154 may be positioned around clutch shaft 108 adjacent bearing 152. Compression spring 127 is between thrust washer 154 and annular piston 122, urging the annular piston toward the PTO disengaged position, in which clutch plates and disks are not in engagement.

In one embodiment, lubrication shut-off valve 156 is a spool that is slidably positioned in internal bore 108 which is the common oil supply passage through the clutch shaft. The lubrication shut-off valve spool may slide in the bore between snap ring 158 and internal shoulder 160. Lubrication oil pressure may act on the first end 157 of the lubrication shut-off valve spool, and clutch activation oil may act on the second end 159 of the spool. The valve spoof shifts between two positions due to the force acting on each end of the spool from lubrication oil pressure and clutch activation oil pressure. When the PTO clutch is disengaged, activation oil pressure is effectively zero. Lubrication oil pressure shifts the valve spool info a position that closes the port for lubrication oil. When the clutch is engaged, activation pressure is much higher than lubrication oil pressure. The high pressure oil shifts the valve spool into the second position which opens the port for lubrication oil. Lubrication oil can flow through the first end 157 of the valve spool and then out radial ports 170 in the spool to lubricate the clutch plates and disks.

The lubrication shut-off valve may include a relief valve 161 inside the valve spool that separates the activation oil from the lubrication oil. If the activation circuit experiences a pressure spike higher than the set point of the relief valve, the relief valve opens, and activation oil is allowed to flow from the high pressure activation side to the low pressure lubrication side of the valve. The relief valve isolates the clutch piston from pressure spikes above the set point of the relief valve. The relief valve can move so that high pressure spikes in the activation oil do not impact piston 126, but can be relieved to the lower pressure lubrication side of the valve. The relief valve 161 may be positioned inside internal bore 162. The relief valve may includes bail 164 that is urged by compression spring 166 to close against seat 168. Radial ports 170 extend between internal bore 162 and the outer diameter of the lubrication shut-off valve spool.

In FIG. 1, the PTO clutch is disengaged, so a gap exists between each of the PTO clutch disks and plates. Clutch activation oil in longitudinal bore 108 is essentially at zero pressure, so compression spring 127 urges annular piston 122 towards cylinder 126. Lubrication oil in longitudinal bore 144 is at low pressure, shifting lubrication shut off valve 156 towards and/or into a first position in contact with internal shoulder 160. In the first position, lubrication oil flow to the PTO clutch disks is closed. Radial flow ports 170 for lubrication oil are blocked by internal bore 108. Radial ports 170 in the spool are not aligned for fluid communication with first radial port 112 in clutch shaft 102. Additionally, relief valve 161 is closed because compression spring 166 urges ball 164 against seat 168.

Figure 2:
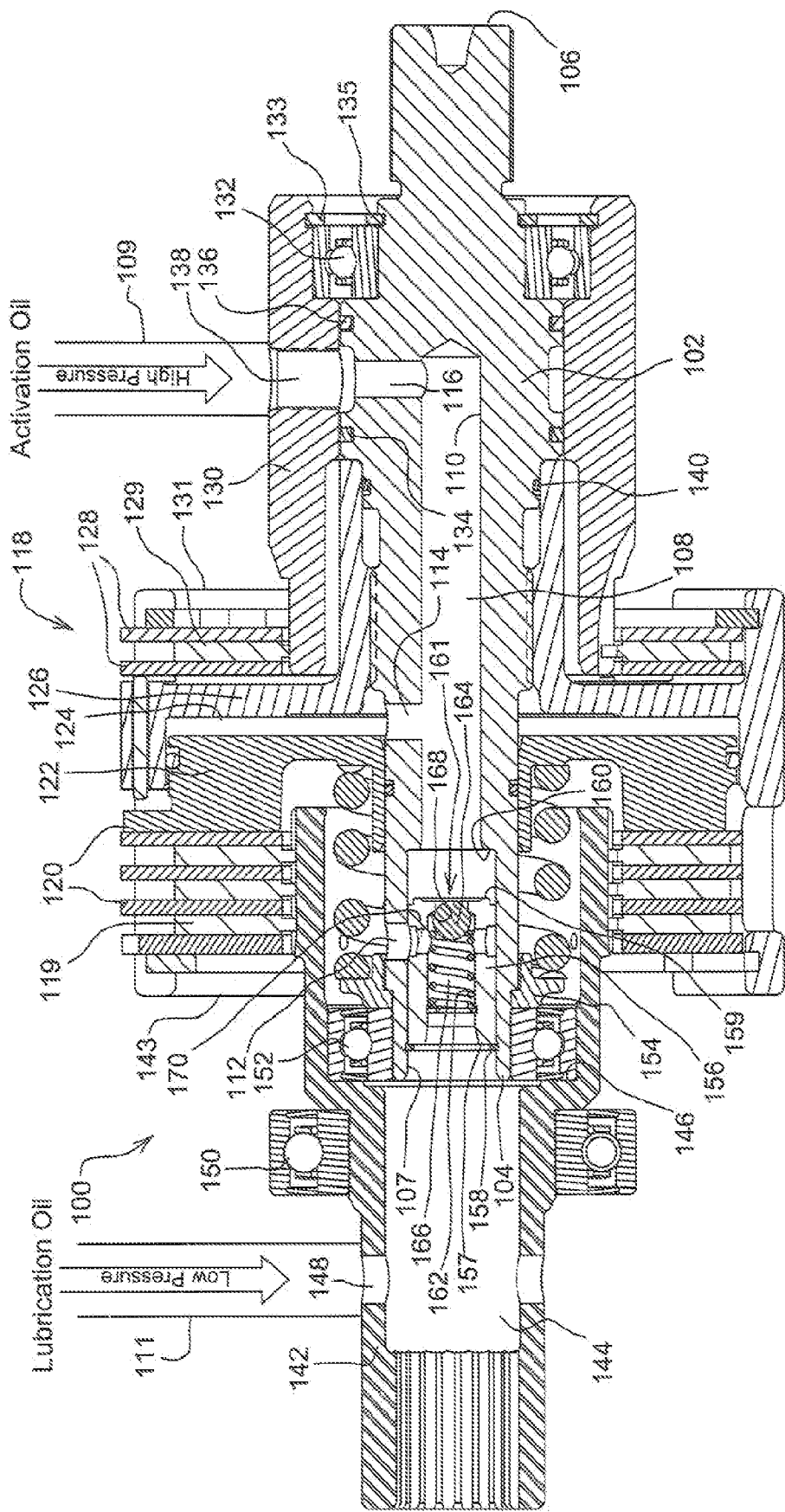
FIG. 2 is a cross section view of a PTO clutch having a lubrication oil shut-off valve and an integrated relief valve according to a first embodiment, with the PTO clutch engaged, lubrication flow on, and the relief valve closed.

In FIG. 2, the PTO clutch is engaged, so PTO clutch disks 119 and plates 120 are in engagement. Activation oil in longitudinal bore 108 is at high pressure. The activation oil enters gap 124 and urges annular piston 122 away from cylinder 126. When the PTO clutch is engaged, activation oil pressure in bore 108 is much higher than lubrication oil pressure in bore 144. The higher pressure oil shifts lubrication shut off valve spool 156 to a second position towards and/or against snap ring 158 which provides a stop. In the second position, radial ports 170 for lubrication oil flow to the PTO clutch disks are open. The flow path for lubrication oil is opened by aligning radial ports 170 in the spool for fluid communication with first radial port 112 in the clutch shaft 102. Relief valve 161 remains closed because compression spring 186 urges ball 164 against seat 188.

Figure 3:
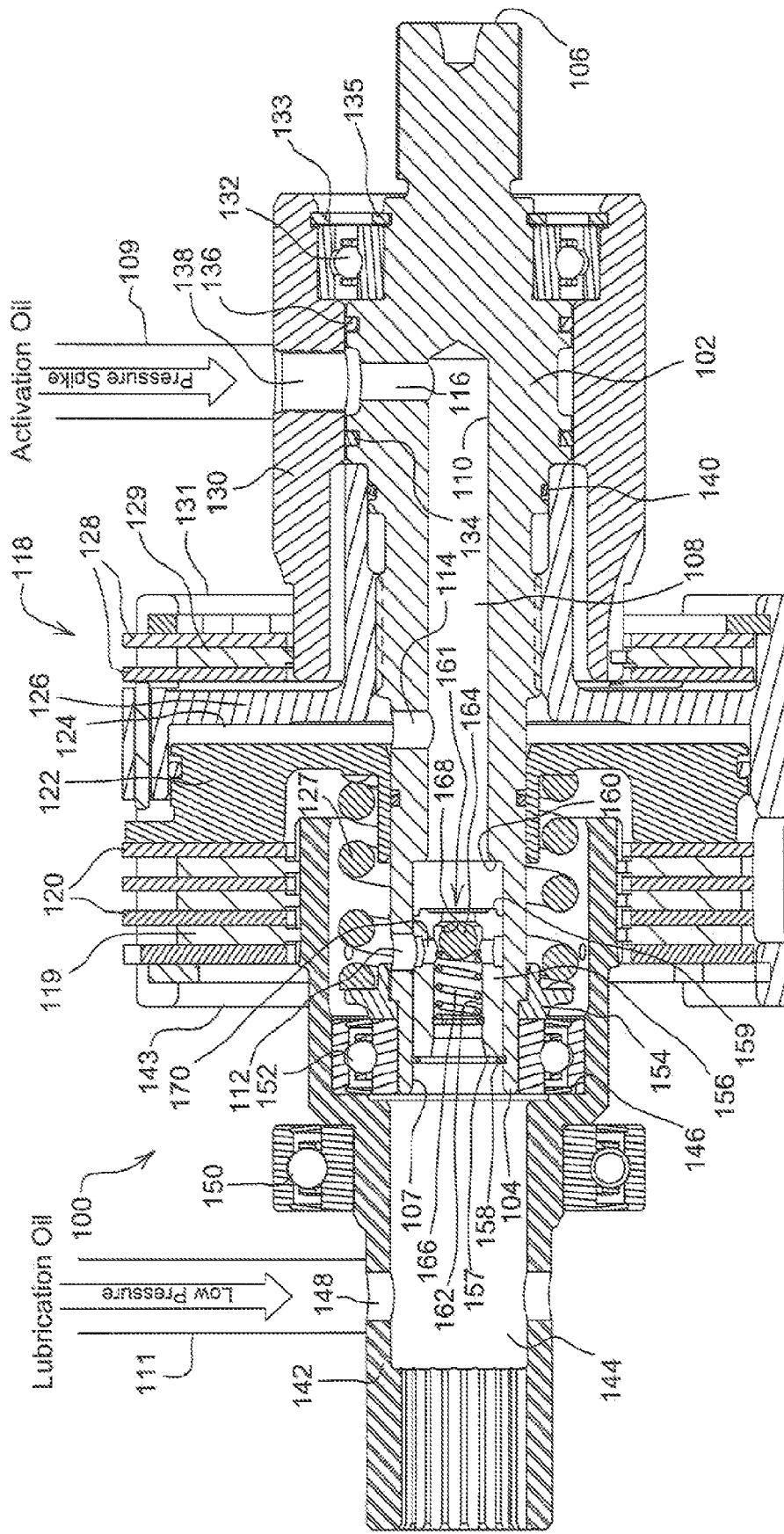
FIG. 3 is a cross section view of a PTO clutch having a lubrication oil shut-off valve and an integrated relief valve according to a first embodiment, with the PTO clutch engaged and experiencing a pressure spike, lubrication flow on, and the relief valve open.
Figure 4:
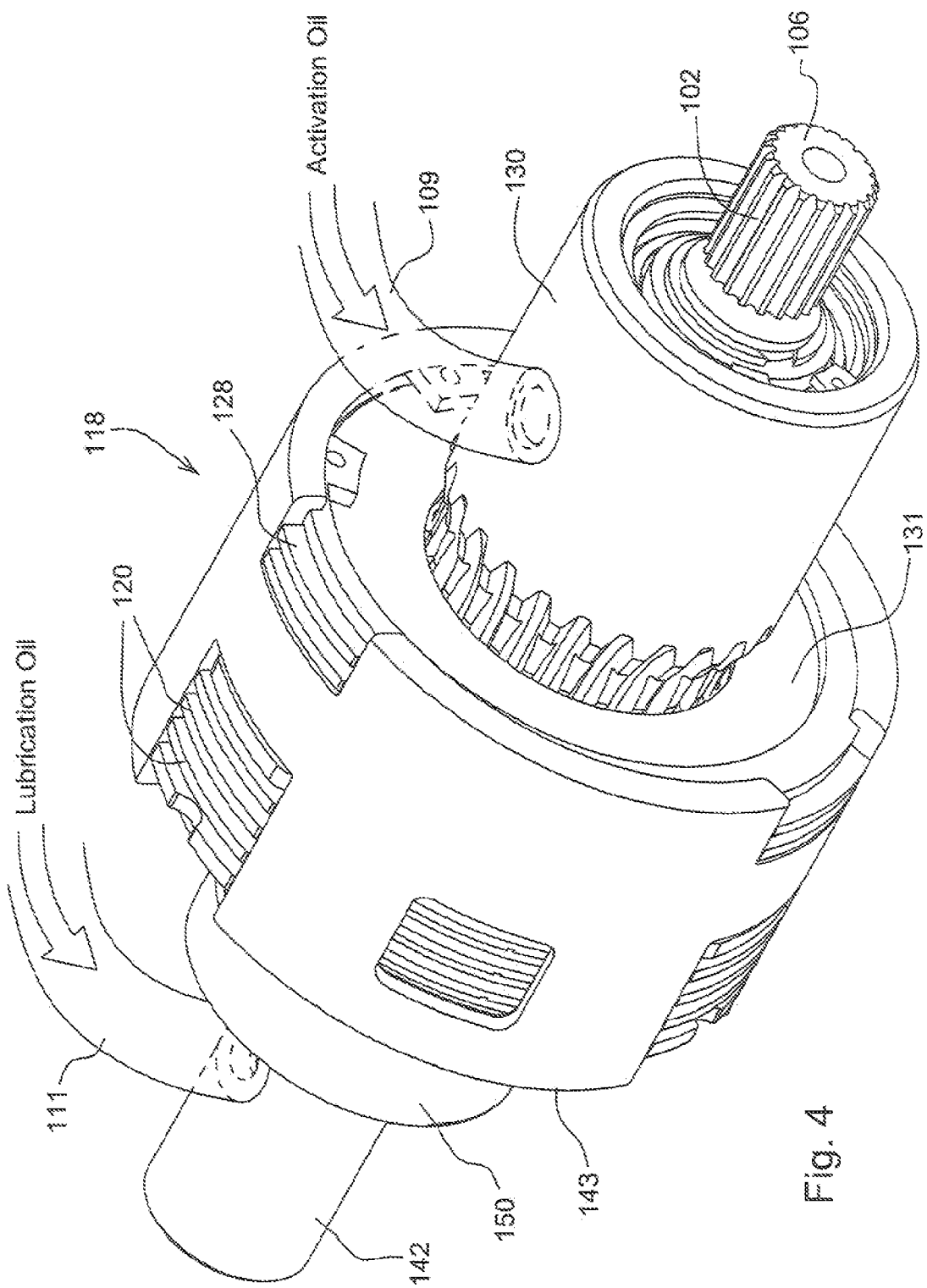
FIG. 4 is a perspective view of a PTO clutch having a lubrication oil shut-off valve and an integrated relief valve according to a first embodiment of the invention.

In FIG. 3, the PTO clutch is engaged, and a pressure spike is experienced in the high pressure PTO clutch activation oil in longitudinal bore 108. As in FIG. 2, activation oil enters gap 124, urges annular clutch piston 122 away from cylinder 126, and brings PTO clutch disks and plates into engagement. Activation oil pressure in bore 108 is much higher than lubrication oil pressure in bore 144, and the higher pressure oil shifts lubrication shut off valve spool 156 to the second position towards and/or against snap ring 158. Lubrication oil flow to the PTO clutch disks and plates is opened by the lubrication shut off valve spool, by aligning radial ports 170 in the spool for fluid communication with first radial port 112 in the clutch shaft 102. However, a pressure spike has opened relief valve 161, unseating ball 164 from seat 168, and compressing spring 166. The activation oil has experienced a pressure spike higher than the set point of relief valve 161, so the bail is unseated, the spring compressed, and oil is allowed to flow from the high pressure activation circuit to the low pressure lubrication circuit. Relief valve 161 isolates the annular clutch piston from pressure spikes above the set point of the relief valve.

The PTO clutch having a lubrication oil shut off valve and integrated relief valve has the advantage of simplifying the main hydraulic circuit that supplies oil to a PTO clutch. The PTO clutch of the present invention eliminates the need for a dedicated activation circuit with a specific pressure setting. The integrated relief valve protects the clutch piston from pressure spikes, and clutch activation pressure can be supplied in parallel with a higher pressure circuit. The PTO clutch of the present invention also eliminates the need for a dedicated supply of lubrication oil for the PTO clutch.

Having described a preferred embodiment, it will become apparent that various modifications can be made without departing from the scope of the invention as defined in the accompanying claims.

The invention claimed is:

1. A PTO clutch, comprising:
   an annular PTO clutch assembly including a central opening, a plurality of friction disks and separator plates, and an annular piston moveable to engage or disengage the disks and plates;
   a clutch shaft inside the central opening and having an internal bore with a lubrication oil inlet end and an activation oil inlet end;
   a lubrication shut-off valve between the lubrication oil inlet end and the activation oil inlet end, the lubrication shut-off valve slidable between a first position blocking a port between the lubrication oil inlet end and the disks and plates, and a second position opening the port between the lubrication oil inlet end and the disks and plates; and
   a relief valve in the lubrication shut off valve, the relief valve opening in response to pressure spikes of activation oil and allow activation oil to move from the activation oil inlet end to the disks and plates.

2. The PTO clutch of claim 1 wherein the relief valve is a bail and spring valve.

3. The PTO clutch of claim 1 further comprising a compression spring urging the annular piston to disengage the disks and plates.

4. The PTO clutch of claim 1 wherein the port is a first radial port between the longitudinal bore and an exterior surface of the clutch shaft, and a radial port in the lubrication shut-off valve is aligned with the first radial port if the lubrication shut off valve is in the second position.

5. The PTO clutch of claim 1 further comprising an internal shoulder in the longitudinal bore, the lubrication shut off valve moving against the shoulder in the first position.

6. The PTO clutch of claim 1 further comprising a compression spring urging the lubrication shut off valve to the first position.

7. A PTO clutch, comprising:
   a lubrication shut off valve spool slideable in a longitudinal bore in response to lubrication oil pressure acting on a first end of the spool and activation oil pressure acting on a second end of the spool, the lubrication shut off valve spool slidable in response to the oil pressure at each end to a first position blocking the flow of lubrication oil to the PTO clutch, or to a second position opening the flow of lubrication oil to the PTO clutch;
   the lubrication shut off valve spool having an internal bore with a relief valve in the internal bore movable from a closed position to an open position in response to spikes in clutch activation oil pressure.

8. The PTO clutch of claim 7 wherein the relief valve includes a ball and a compression spring urging the ball against a seat.

9. The PTO clutch of claim 7 further comprising a radial port in the lubrication shut off valve spool.

10. The PTO clutch of claim 7 wherein the longitudinal bore includes an internal shoulder which the lubrication shut off valve spool abuts in the first position.

11. A PTO clutch, comprising:
    a clutch shaft having a longitudinal bore;
    a lubrication oil port and a clutch activation oil port, each port extending radially from the bore;
    a lubrication shut-off valve slideable in the longitudinal bore to a first position blocking flow to the lubrication oil port and a second position opening flow to the lubrication oil post; the lubrication shut-off valve having an internal bore; and
    a relief valve positioned in the internal bore of the lubrication shut-off valve and moveable between a closed position blocking flow of activation oil through the internal bore and an open position allowing flow of activation oil through the internal bore.

12. The PTO clutch of claim 11 wherein the relief valve is biased toward the closed position.

13. The PTO clutch of claim 11 further comprising a port extending radially from the relief valve for flow of lubrication oil.

14. The PTO clutch of claim 11 wherein the relief valve is biased with a spring to the closed position.

15. The PTO clutch of claim 11 wherein the clutch shaft extends through a central opening in a PTO clutch assembly.

* * * * *